Figure 1:
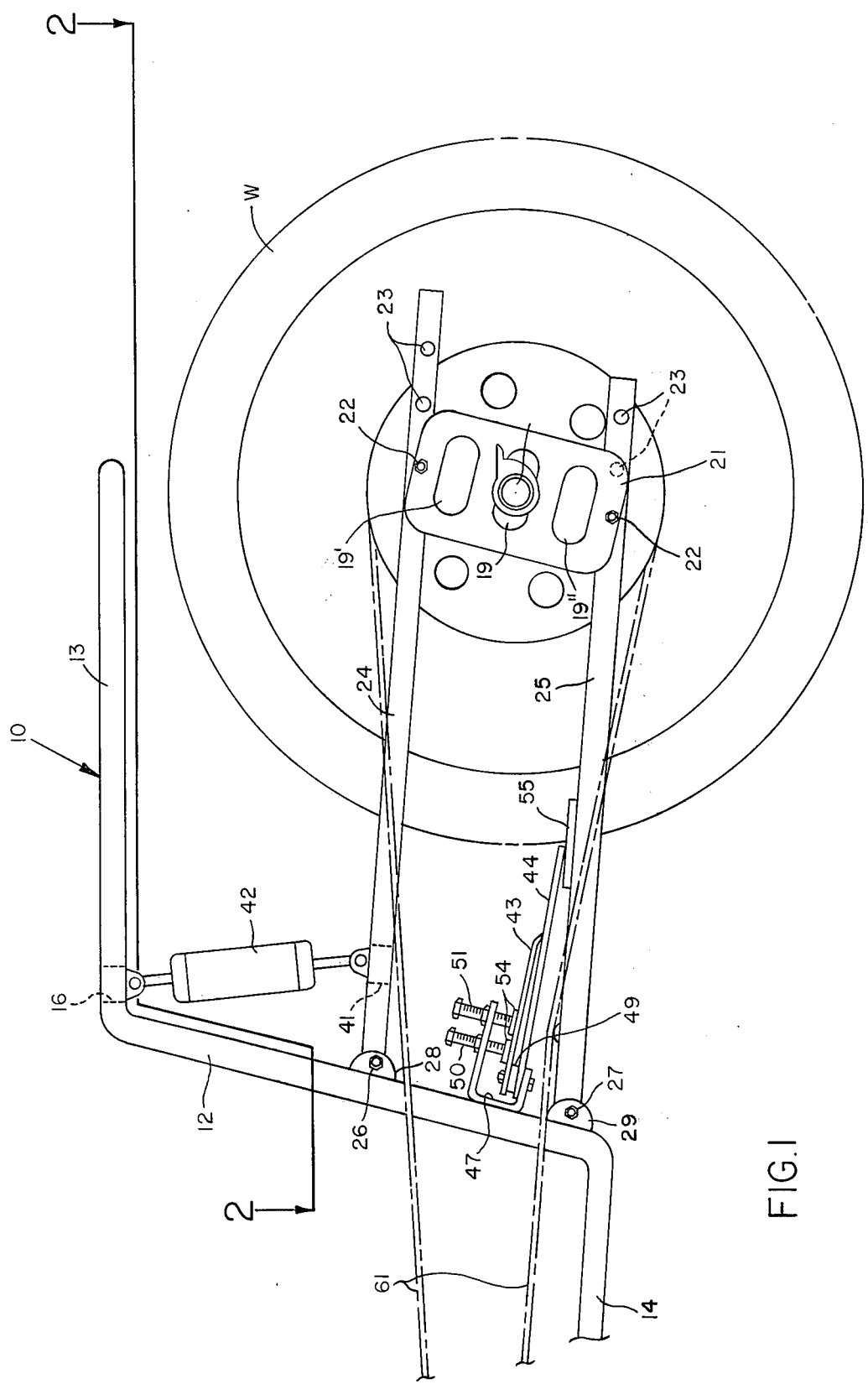

United States Patent [19]

Lutz

[11] 4,114,918
[45] Sep. 19, 1978

[54] SUSPENSION SYSTEM FOR WHEEL OF A MOTOR BIKE

[75] Inventor: Peter M. Lutz, Rochester, N.Y.

[73] Assignee: Parlec, Inc., Fairport, N.Y.

[21] Appl. No.: 778,847

[22] Filed: Mar. 18, 1977

[51] Int. Cl.² ............................................ B62K 25/04
[52] U.S. Cl. .................................. 280/284; 180/32; 267/54 R
[58] Field of Search ................... 280/284, 288; 180/32; 267/19 R, 19 A, 41, 54 R

[56] References Cited

U.S. PATENT DOCUMENTS

| | | | |
|---|---|---|---|
| 3,484,091 | 12/1969 | Draves | 267/54 R |
| 3,917,313 | 11/1975 | Smith | 180/32 |
| 3,974,892 | 8/1976 | Bolger | 180/32 |
| 4,058,181 | 11/1977 | Buell | 280/284 |

FOREIGN PATENT DOCUMENTS 14,132 of 1915 United Kingdom .................... 280/284

*Primary Examiner*—Kenneth H. Betts

*Attorney, Agent, or Firm*—Shlesinger, Fitzsimmons & Shlesinger

[57] ABSTRACT

The rear wheel of a bike is journaled in a pair of spaced, parallel plates, which are adjustably secured to the outer ends of two pairs of rigid suspension bars, the inner ends of which are mounted to pivot on a cycle frame about axes parallel to axes of the bike's wheels. Two of the bars are pivotal one above the other at one side of the cycle, and two are pivotally mounted in a similar manner at the opposite side of the cycle and are held in lateral registry with the first pair by transverse brackets. One or more shocks are interposed between the frame and one of said transverse brackets to resist upward movement of the suspension bars; and a pair of adjustable leaf springs are mounted at each side of the frame and have free ends engaging a pair of suspension members also to resist upward, pivotal movement thereof relative to the frame. The shock absorber is designed to have its piston positioned approximately at mid travel when the bike is unloaded, therefore allowing more pivotal movement of the rear wheel relative to the frame than on conventional bikes.

7 Claims, 2 Drawing Figures

SUSPENSION SYSTEM FOR WHEEL OF A MOTOR BIKE

This invention relates to motor bikes, and more particularly to an improved mechanism for suspending the rear wheel of a bike, such as a motorcycle.

One of the most desirable features of a motor bike or motorcycle is the stability of the cycle during use. While the average operator finds little difficulty controlling a cycle on a conventional, well paved highway, it becomes far more difficult to control the cycle on rough or unpaved terrain. Experience has indicated that one of the most important factors affecting the stability of such cycles is the quality of the suspension of the rear wheel, which usually is the driving wheel for the cycle. The better the suspension of this wheel, the easier it is to maintain control of the cycle during travel on rough terrain.

Most existing bikes utilize a single, generally U-shaped yoke, which is pivotally mounted at its closed end to the rear of a motocycle frame, and supports between its parallel legs the rear wheel of the bike. The two legs of the yoke member usually are connected to the cycle frame by coil springs, or the like, to absorb some of the shock that is imparted to the rear wheel of the cycle during use. A major disadvantage of this type of suspension is that the rear wheel tends to twist or turn slightly between the two legs of the supporting yoke, when the bike is used on difficult roads or trails, as for example during road racing or hill climbing.

One way of minimizing this twist and increasing the stability of the rear wheel of a cycle is to employ a suspension system which simulates the use of dual yokes for supporting the rear wheel, as disclosed, for example, in U.S. Pat. No. 3,917,313. The difficulty with a construction of the type disclosed in this patent, however, is that it produces an abnormal loading on the front wheel making it extremely difficult to deliberately lift the front wheel during use. Moreover it fails to provide a satisfactory means for stabilizing the swinging or pivotal movement of the rear wheel relative to the cycle frame during use. Moreover, while it is imperative that the rear wheel be mountd for movement relative to the frame in order to absorb the repeated shock loadig or the rear wheel, it is extremely important also to control this movement so that it does not interfere with the tracking ability of the front wheel of the bike.

It is an object of this invention, therefore, to provide an improved suspension system for the rear wheel of a motorcycle, or the like, which lends extreme stability to the cycle during use, and also effectively dampens the pivotal movement of the rear wheel relative to the bike frame during use.

A further object of this invention is to provide an improved suspension system of the type described which allows greater pivotal movement of the rear wheel of a bike in a downward direction relative to the bike frame during use than was previously possible with conventional bike suspension systems.

A further object of this invention is to provide an improved suspension system of the type described which uses two pairs of pivotal members for suspending the rear wheel on the bike frame, and in addition, both shock-absorbing means and adjustable leaf spring means interposed between the bike frame and the suspension members for resisting pivotal movement thereof relative to said frame.

Still another object is to provide a suspension system of the type described which permits ready adjustment of the center of gravity of the bike by adjustment of its rear wheel on the bike frame.

Other objects of the invention will be apparent hereinafter from the specification and from the recital of the appended claims, particularly when read in conjunction with the accompanying drawings.

Figure 2:
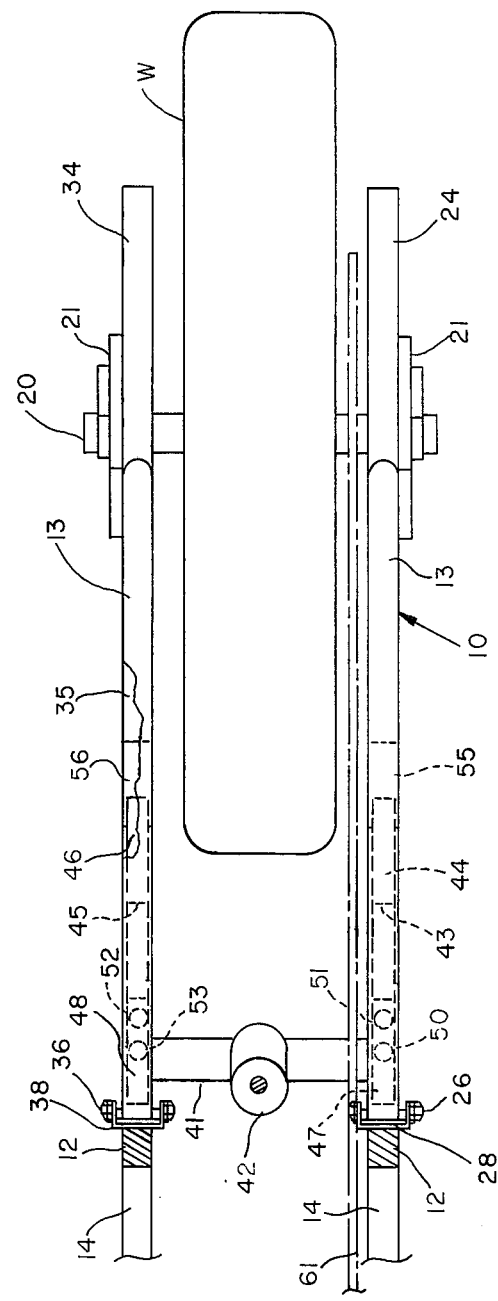

In the drawings:

FIG. 1 is a fragmentary side elevational view of the rear portion of a motor bike having an improved rear wheel suspension system make according to one embodiment of this invention; and FIG. 2 is a fragmentary sectional view taken along the line 2—2 in FIG. 1 looking in the direction of the arrows.

Referring now to the drawings by numerals of reference, 10 denotes a pair of spaced, parallel, identically-shaped frame members which may be fabricated from steel bars or the like. Each member 10 includes a central section 12, which is disposed to be inclined slightly to the vertical as shown in FIG. 1, a trailing section 13 which projects rearwardly from the upper end of each section 12, and a forwardly extending section 14, which projects from the lower end of the associated frame section 12. The two frame members 10 are secured in spaced relation by a plurality of transverse cross members, such as for example by the bar 16 (FIG. 1), which is secured at opposite ends to the confronting surfaces of the trailing section 13 of the frame members 10. Similar members or brackets (not illustrated) extend between the forwardly projecting sections 14 of the frame members to help support the front portion of the cycle, which may be of any conventional design.

Opposite ends of the axle 20 of the rear wheel W of the bike extend through and are rotatably journaled in a pair of registering slots 19 that are formed in two, identically-shaped mounting plates 21, which are located at opposite sides, respectively, of the bike. One plate 21 is removably fastened at opposite ends thereof by bolts 22 to the outer ends of a pair of spaced, parallel metal straps or suspension bars 24 and 25, the inner ends of which are pivotally connected by pins or bolts 26 and 27 to the legs of a pair of spaced, generally U-shaped brackets 28 and 29, respectively, which are secured to the rear face of one of the frame sections 12. Each bolt 22 passes through one of a plurality of spaced openings 23 (three in the embodiment illustrated) formed in the outer end of each member 24 and 25.

Likewise, the other mounting plate 21 for the rear axle is removably fastened at opposite ends thereof to the outer ends of another pair of spaced, parallel, suspension bars 34 and 35, which as in the case of the bars 24 and 25, are pivotally mounted at their inner ends by bolts 36 to the legs of a pair of spaced, generally U-shaped brackets 38 (only one of which is shown in FIG. 2) that are fastened to the rear face of the other frame section 12 in registry with the brackets 28 and 29, respectively.

The two upper suspension bars 24 and 34 are connected intermediate their ends by a cross bracket 41; and this bracket is in turn connected by at least one shock absorber 42 to the cross bracket 16 which extends between the trailing sections 13 of the frame members 10. Thus, any shock loading which tends to pivot the suspension members 24, 25 and 34, 35 upwardly about their pivotal axes is cushioned or absorbed by the shock absorber 42, thus helping to stabilize the rear end of the cycle during use.

The pivotal movements of the suspension bars 24, 25 and 34, 35 about their respective axes is further dampened by two pairs of leaf springs 43, 44 and 45, 46, which are located adjacent opposite sides, respectively, of the bike. At their inner ends of the springs of each pair 43, 44 and 45, 46 are separated by spacers 49, and are bolted or otherwise secured to one leg (the lower leg as shown in FIG. 1) of a further pair of generally U-shaped brackets 47, 48, respectively, which are fastened to the rear surfaces of the frame sections 12 just above the lower suspension bars 25 and 35.

One leg (the upper as shown in FIG. 1) of each bracket 47 and 48 extends beyond its corresponding lower leg to overlie the inner end of the upper, or shorter leaf spring 43 or 45 of the associated pair. Threaded intermediate their ends in the upper legs of the brackets 47 and 48 are two pairs adjusting screws or bolts 50, 51 and 52, 53, respectively. Each of these screws 50 to 53 has on its lower end a pressure pad 54, which is engagable with the associated upper leaf spring 43 or 45 intermediate its ends, and which is designed to function as an adjustable fulcrum for the associated leaf spring.

The outer or free ends of the springs 45 and 46 rest upon pressure plates 55 and 56 which are fastened to the upper surfaces of the lower suspension bars 25 and 35, respectively. By adjusting the screws 50 to 53, the pressure applied by the pairs of springs 43, 44 and 45, 46 to the plates 55 and 56 can be adjusted to suit the weight of the particular individual operating the bike.

The usual chain for driving the rear wheel W of the bike is denoted at 61, and in the embodiment illustrated travels adjacent the lower of the two frame members 10 shown in FIG. 2.

In use the leaf springs are adjusted, depending upon the weight of the operator, by threading one or the other sets of screws 50, 52 or 51, 53 into the bracket arms until the associated pads engage the upper leaf springs 43 and 45. At this time the piston in the shock absorber 42 is approximately in its mid position, so that if the rear end of the frame 10 were to be lifted, the suspension members could pivot slightly downwardly thereby allowing the wheel to drop slightly relative to the frame, even to the point where the springs become disengaged from plates 55, thus allowing the wheel W to track or follow even the largest of holes in the terrain without causing the front end of the bike to pivot upwardly, as is the case with most conventional bike suspension systems. Moreover, during the operation of the bike the bars 24 and 25 are held parallel to each other, as are the bars 34 and 35, so that the axle 20 in turn is held parallel to the pivotal axes of the suspension bars 24, 25 and 34, 35 at all times. This eliminates any undesirable twisting of the wheel W relative to the frame members 10, and assures that the shock absorber and leaf springs will exert uniform pressure on the suspension members at opposite sides, respectively, of the cycle.

Since it may at times be desirable to operate the bike with the rear end of frame 10 located either higher or lower with respect to the roadway, each of the plates 21 is provided with two additional slots 19' and 19" at opposite sides of slot 19 for selectively supporting the rear axle in higher or lower positions relative to the frame. Also, in order to adjust the location of wheel W forwardly or rearwardly on frame 10 to effect a corresponding change in the center of gravity of the bike, each of the suspension members has three equi-spaced openings 23 in its rear end for supporting plates 21 selectively in three different positions on the frame.

Although not illustrated, it is anticipated also that the shock absorber 42 could be mounted between the frame and the lower suspension bars, and the leaf springs and their adjusting assemblies could be mounted so that the free ends of the leaf springs would bear against the upper surfaces of the upper suspension bars or could be placed adjacent the undersides of the suspension bars and have their free ends shackled to the bars. In either such modified embodiment, of course, the leaf springs assist the shock absorber 42 in dampening the pivotal movement of the rear wheel W relative to the frame of the cycle. In all embodiments, of course, the suspension bars 24, 25 and 34, 35 are held parallel to each other so that the axle 20 of the wheel will be held parallel to the pivotal axes of the suspension bars.

Moreover, it is to be understood that the novel suspension system disclosed herein is likewise designed for supporting the front wheel of a cycle, if desired.

In view of the foregoing it will be apparent that applicant's invention provides relatively simple, inexpensive, and extremely reliable means for stabilizing the rear wheel of a motorcycle, or the like. In view of the adjustability of each leaf spring assembly, it is possible, regardless of the weight or size of the operator, readily to adapt the cycle to travel on different types of terrain, and in all cases, maintaining the stability of the bike. As a matter of fact, the above-described suspension has been found to be extremely suitable for use in competitive motorcycle racing, climbing, etc. By employing in each leaf spring assembly both the long and short leafs separated by the spacer 49, the cycle is provided with progressive spring action (first the longer then the shorter springs taking effect) which allows a softer ride. This also permits greater shock absorber control so that the shocks run cooler and retain their dampening effect longer. Also, the shock absorber is not surrounded, as in the usual manner, with a coil spring, and in effect operates solely as a dash pot to cushion the upward pivotal movement of the suspension arms, and as noted above, is only at approximately mid travel when the bike is unloaded, so that the wheels follow the terrain much better. The double suspension bars of each side of the cycle tend to cut down the front wheel lifting effect and braking dive. Moreover the springs are cheaper to manufacture, readily adjustable, and easier to change for wider preference, as compared to other springs heretofore employed.

While the invention has been illustrated and described in detail in connection with only a single embodiment thereof, it will be apparent that it is capable of further modification, and that this application is intended to cover any such modifications as may fall within the scope of one skilled in the art or the appended claims.

Having thus described my invention, what I claim is:

1. A suspension system for the wheel of a cycle having a frame and at least one forward and one rear wheel, comprising two pairs of spaced, parallel suspension bars pivoted to the frame adjacent opposite sides, respectively, of the cycle to pivot about a first pair of spaced, parallel axes disposed generally horizontally one above the other when the cycle is in use, a pair of spaced, parallel plates removably secured adjacent opposite ends thereof to said suspension bars at opposite sides of the cycle for pivotal movement upwardly and downwardly with said bars about said axes, an axle for one of said forward and rear wheels, respectively, rotatably journaled adjacent opposite ends thereof in said plates to support its associated wheel for rotation about an axis parallel to said first pair of axes, and first and second means interposed between said frame and said suspension bars for resisting pivotal movement of said bars about said axes, one of said means comprising a pair of leaf spring assemblies secured to said frame adjacent opposite sides, respectively, of said cycle, each of said assemblies having at least one leaf spring fixed at one end and having a free end connected with one of said suspension bars at the adjacent side of the cycle to resist pivotal movement of the last-named bar upwardly relative to said frame, and means for manually adjusting the forces with which the free ends of each of said one leaf springs resists pivotal movement of its associated suspension bar.

2. A suspension system as defined in claim 1, wherein each of said assemblies comprises a second, shorter leaf spring overlying said one spring thereof, and having a fixed end fixed to, and spaced slightly from, said fixed end of said one spring of the assembly.

3. A suspension system for the wheel of a cycle having a frame and at least one forward and one rear wheel, comprising two pairs of spaced, parallel suspension bars pivoted to the frame adjacent opposite sides, respectively, of the cycle to pivot about a first pair of spaced, parallel axes disposed generally horizontally one above the other when the cycle is in use, a pair of spaced, parallel plates removably secured adjacent opposite ends thereof to said suspension bars at opposite sides of the cycle for pivotal movement upwardly and downwardly with said bars about said axes, an axle for one of said forward and rear wheels, respectively, rotatably journaled adjacent opposite ends thereof in said plates to support its associated wheel for rotation about an axis parallel to said first pair of axes, and first and second means interposed between said frame and said suspension bars for resisting pivotal movement of said bars about said axes, one of said means comprising a pair of leaf spring assemblies secured to said frame adjacent opposite sides, respectively, of said cycle, each of said assemblies having at least one leaf spring fixed at one end and having a free end connected with one of said suspension bars at the adjacent side of the cycle to resist pivotal movement of the last-named bar upwardly relative to said frame, and a first pair of said bars being pivotally mounted adjacent one side of said frame for pivotal movement one above the other about said first pair of axes, and in lateral registry with a second pair of said bars which are mounted for pivotal movement one above the other adjacent the opposite side of said frame, and means for releasably securing said plates in lateral registry with each other on said bars and selectively in one of several different positions which are differently spaced from the front wheel of said cycle thereby selectively to change the center of gravity of the cycle.

4. A cycle, comprising a frame, a pair of upper suspension bars pivotally connected at one end each to said frame adjacent opposite sides thereof to pivot about a first axis extending transversely of said frame, a pair of lower suspension bars pivotally connected at one end each to said frame adjacent opposite sides thereof to pivot beneath said upper suspension bars about a second axis extending transversely of said frame beneath and parallel to said first axis, means for holding said bars in spaced, parallel relation to each other, including a pair of rigid, axle-supporting plates secured to the free ends of said bars adjacent opposite sides, respectively, of said frame, one of said plates being secured adjacent opposite ends thereof to the two suspension bars located adjacent one side of said frame and extending between said two bars, and the other of said plates being secured adjacent opposite ends thereof to the other two suspension bars located adjacent the opposite side of said frame and extending between the two last-named bars, a wheel axle journaled adjacent opposite ends thereof in registering openings in said plates to support one of the wheels of said cycle for rotation between said plates, a pair of leaf spring assemblies mounted on said frame adjacent opposite sides thereof, and each of said assemblies having a resilient leaf spring one end of which bears resiliently against one of said suspension bars at the adjacent side of said frame to resist pivotal movement of the last-named bar about its pivotal axis, and means on each of said assemblies for adjusting the force with which the associated leaf spring bears against the associated suspension bar.

5. A cycle as defined in claim 4, wherein each of said assemblies includes a second leaf spring shorter than the first-named leaf spring and overlying a portion thereof, and the two springs in each of said assemblies have registering ends fixed to each other and to said frame, and a spacer is interposed between said registering ends of each pair of springs in an assembly thereof.

6. A cycle as defined in claim 5, wherein the two springs of each assembly have their fixed ends secured to a bracket, and a pair of spaced, parallel adjusting screws are adjustably threaded into each bracket and have operating ends selectively engageable with one of the two springs of each assembly intermediate its ends selectively to provide two different fulcrum points for the last-named spring.

7. A cycle as defined in claim 4, including at least one shock absorber interposed between said frame and one of said upper and lower pairs, respectively, of said suspension bars.

* * * * *